W. H. PEASE.
ILLUMINATING DEVICE.
APPLICATION FILED OCT. 6, 1911.
1,036,000.
Patented Aug. 20, 1912.
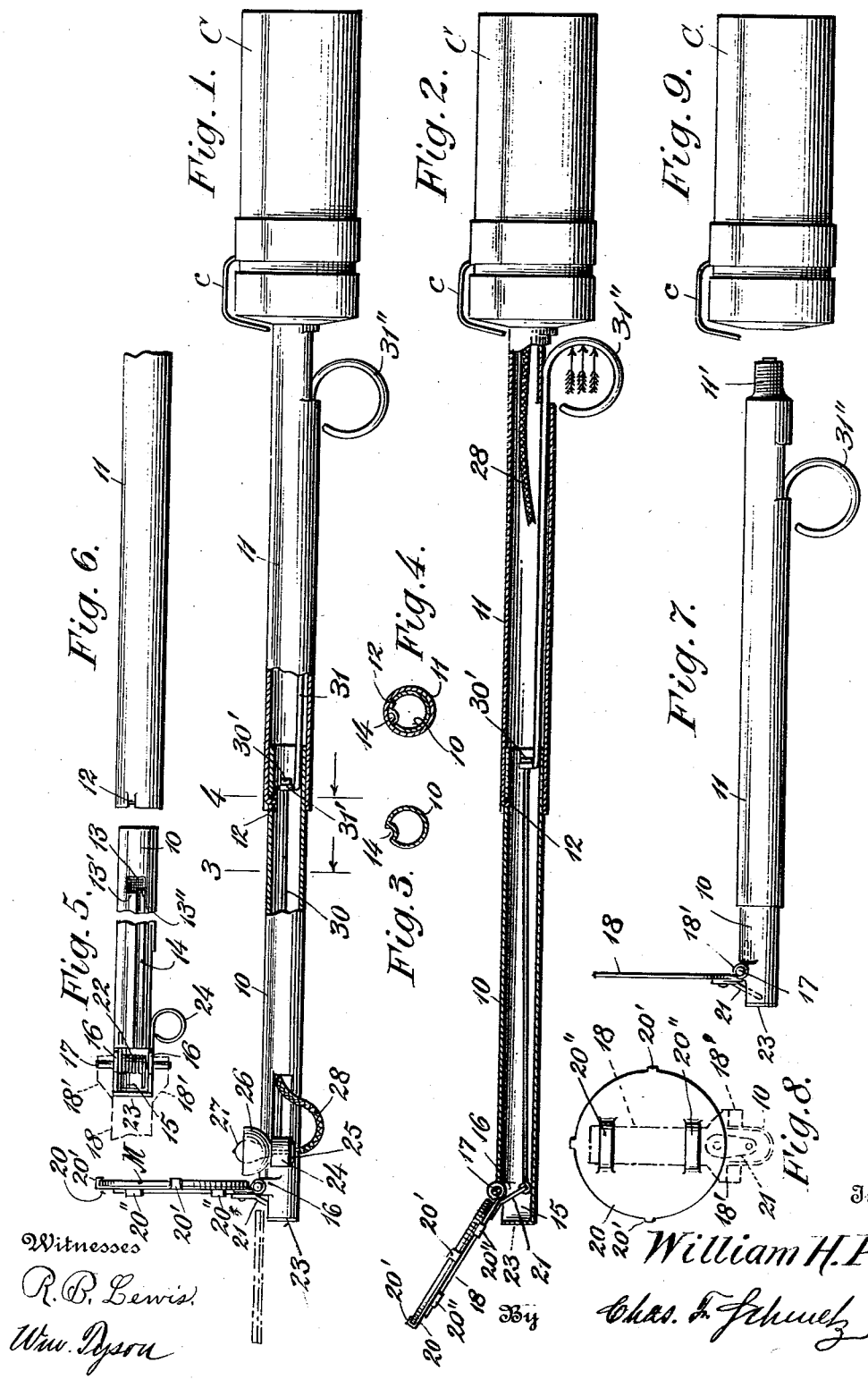

UNITED STATES PATENT OFFICE.

WILLIAM H. PEASE, OF MOUNT VERNON, NEW YORK.

ILLUMINATING DEVICE.

1,036,000.　　　　　Specification of Letters Patent.　　Patented Aug. 20, 1912.

Application filed October 6, 1911. Serial No. 653,265.

*To all whom it may concern:*

Be it known that I, WILLIAM H. PEASE, a citizen of the United States, and a resident of Mount Vernon, in the county of Westchester and State of New York, have invented certain new and useful Improvements in Illuminating Devices, of which the following is a specification.

This invention relates to illuminating devices, or portable lights, and it has for one of its objects the provision of such a device which comprises a tubular rod having at one end thereof a mirror which serves as a reflector in which the operator may see the object being examined by means of a light thrown thereon from a lamp disposed near the mirror, the latter being adapted to be properly positioned relatively to the lamp, by the operator.

The invention has, furthermore, for its object, the improved construction of the device as a whole so that it may be extended or lengthened for use, and so that it may be shortened so as to render it adaptable for carrying in the pocket or kit.

Further objects of the invention will hereinafter appear and be particularly defined in the claims.

The invention has been clearly illustrated in the accompanying drawings, in which:—

Figure 1 is a side view of an illuminator embodying my invention, as ready for use; Fig. 2 is a central longitudinal section thereof, the mirror being slightly tilted; Fig. 3 shows a cross-section, line 3 of Fig. 1; Fig. 4 is a similar section, on line 4 of Fig. 1; Figs. 5 and 6 represent respectively top views of the adjacent telescoping tubes of the device, the better to illustrate the interlock between them; and, Figs. 7 to 9 show the several separable parts of the device disassembled and ready to be carried in pocket or kit, Fig. 7 showing the telescoping tubes nested, Fig. 8 illustrating the mirror in back-view, and Fig. 9 representing the electric cell which may be connected to the tubes and will furnish the current for the lamp circuit.

Briefly stated, the present device constitutes an improvement over the illuminating device for which U. S. Letters Patent were issued to Herbert E. Marcy on July 18, 1911, being No. 998,021, to which reference may be had. These improvements comprise the extensibility and contractibility of the rod which is manipulated by the operator, so that it may be readily extended for use, or dis-assembled to be put away. Also, the mirror in the present invention is normally held in position adjacent the light by means of a spring, and the operator may tilt the mirror by direct pull on a finger-ring, without being obliged to move the latter in the opposite direction to return the mirror to normal position.

Referring to the drawings, 10 denotes the front section or tube of a holder which comprises also another tube-section 11, the latter being sufficiently large to permit the front section 10 to telescope thereinto. In order to maintain the tube-sections in extended positions a lock is provided, comprising a lip 12 on the front end of the main section 11 formed by slitting the metal and bending it inwardly to adapt it to engage the wall 13′ of a cross-slot 13 formed in the body of the front tube 10. By referring to Fig. 5 it will be noted that the wall 13′ is slightly depressed relatively to the body 13″ so that the lip 12 becomes lodged in what may be termed a recess, and thus is held against accidental displacement rotatively. The front tube 10 is also provided with a groove 14 formed by a longitudinal indentation in which the lip 12 may slide when the instrument is to be collapsed.

At its front end the tube 10 is cut away at its top to form a pocket 15 flanked by a pair of ears 16 in which is held a stud 17 bearing at its outer projecting ends the branches 18′ of a bifurcated bracket 18 to which a mirror M may be attached. The mirror is preferably mounted on a backing plate 20 having ears 20′ bent around the margin of the mirror, and it has also loops 20″ adapted to receive the bracket-member 18 above mentioned.

Secured to the back of the bracket is an arm 21 which serves as a stop for the pivotal movement of the mirror bracket against the action of a spring 22 which surrounds the stud 17 and normally throws the mirror into position shown in Fig. 1, in which position the arm 21 abuts against the inner face of an end-wall or closing plate 23 of the tube.

The side of the tube 10 is slitted to form a tongue 24 which is then curled into ring form for the reception of a lamp socket 25 having a reflector hood 26 and a lamp 27. A lamp-cord 28 leads through the tube sections 10, 11 to an electric cell C which is detachably secured to the screw-threaded end 11' of tube 11, and which has a spring-contact c to establish the lamp circuit by means of thumb pressure when desired.

Means are provided for tilting the mirror into position indicated by dotted lines in Fig. 1 and in full lines in Fig. 2, these means consisting preferably of an extensible rod comprising the link sections 30, 31, the latter having at its front end an eye 31' through which the link 30 may slide, the latter having a button-head 30' engaged by said eye when the link 31 is pulled rearwardly by finger pressure exerted on a loop 31''.

From the foregoing it will be understood that the present device can be readily disassembled into the several separate elements represented in Figs. 7, 8, and 9, respectively, and that, furthermore, it can be easily reassembled and extended into the condition illustrated in Fig. 1, ready for use.

Many changes can be made in the particular construction and organization of some of the elements of the device, without departing from the spirit of the invention.

I claim:—

1. A device of the character described comprising a lamp, a rod supporting the same and having at its end a pair of ears, a mirror pivoted on said ears, a spring for holding said mirror normally at an angle to the axis of the rod, and manual means for tilting said mirror.

2. A device of the character described comprising a lamp, a tubular rod supporting the same and having at its end a pair of ears, a mirror pivoted on said ears, a spring for holding said mirror normally at an angle to the axis of the rod, and a manually-operated link passing through said rod.

3. A device of the character described comprising a lamp, a mirror, a rod pivotally supporting the same at one end thereof and comprising a plurality of sections adapted to be extended and contracted, and an extensible rod extending longitudinally of the supporting rod for tilting said mirror.

4. A device of the character described comprising a lamp, a mirror, a rod pivotally supporting the same at one end thereof and comprising a plurality of sections, means for supporting said sections for sliding movement on each other and a pull rod comprising a plurality of sections slidably mounted on each other, for tilting said mirror.

5. A device of the character described comprising a lamp, a mirror, a rod pivotally supporting the same at one end thereof, and comprising a plurality of sections adapted to be extended and contracted, and a pair of slide-links for tilting said mirror.

6. The combination with a mirror, of a rod comprising a pair of telescopic tubular sections, a lamp attached to one section, means for tiltably supporting a mirror on said section, resilient means for normally holding the mirror in predetermined position relatively to its supporting section, means for locking said holder section in extended position, and a pull-rod for tilting said mirror.

7. The combination with a mirror, of a rod comprising a pair of telescopic tubular sections, a lamp attached to one section, means for tiltably supporting the mirror on said section, resilient means for normally holding the mirror in predetermined position relatively to its supporting section, an inwardly-projecting lip carried by one tube-section and adapted to engage the wall of a cross-slot in the other section for locking said holder section in extended position, and a pull-rod for tilting said mirror.

In testimony that I have claimed the foregoing as my own, I have signed this specification in the presence of two subscribing witnesses.

WILLIAM H. PEASE.

Witnesses:
JAMES H. WOOLNOUGH,
WILLIAM H. SOMMER.